United States Patent Office 3,317,791
Patented May 2, 1967

3,317,791
CIRCUIT-CONTROLLING SYSTEMS
Robert W. Price and Robert A. Few, Bloomington, Ind., assignors to Westinghouse Electric Corporation, Pittsburgh, Pa., a corporation of Pennsylvania
Filed Feb. 26, 1965, Ser. No. 435,424
7 Claims. (Cl. 317—22)

This invention relates to circuit-controlling systems and has particular relation to reclosing circuit breakers.

In accordance with the invention, an improved control is provided for governing the tripping and reclosing of a circuit breaker. The tripping of the circuit breaker is determined by a static array of components which respond to the line or zero-sequence currents in a protected line section and which may be adjusted to provide any of a number of time-delay characteristics.

When a fault occurs on the protected line section the control trips and recloses the circuit breaker in a predetermined pattern which for a permanent fault may trip and reclose the circuit breaker a preselected adjustable number of times and then lockout the circuit breaker in its open condition.

In a preferred embodiment of the invention, each of the reclosures may occur instantaneously or a substantial time after the immediately preceding tripping operation as determined by a static timer. The pattern of successive reclosures and lockout is determined by a stepping device which is advanced in response to an operation of the circuit breaker.

If the circuit breaker remains closed for a predetermined time following a reclosure thereof, a static timer operates to reset the control.

In the event of a fault in which the fault current exceeds a predetermined level it, in many instances, is desirable to immediately lockout the circuit breaker without going through the successive steps of opening and closing the circuit breaker which is desirable in case there is a possibility that the fault may clear during the cycling operation.

It is therefore an object of the invention to provide an improved control for governing the tripping and reclosing of a circuit breaker.

It is also an object of the invention to provide an improved control having static components and having adjustable time-delay characteristics for governing tripping of a circuit breaker.

It is another object of the invention to provide an improved reclosing circuit-breaker which in the event of an abnormally high fault current will lockout the circuit breaker after a single opening of the breaker.

Other objects of the invention will be apparent from the following description taken in conjunction with the accompanying drawings, in which:

Figure 1A:
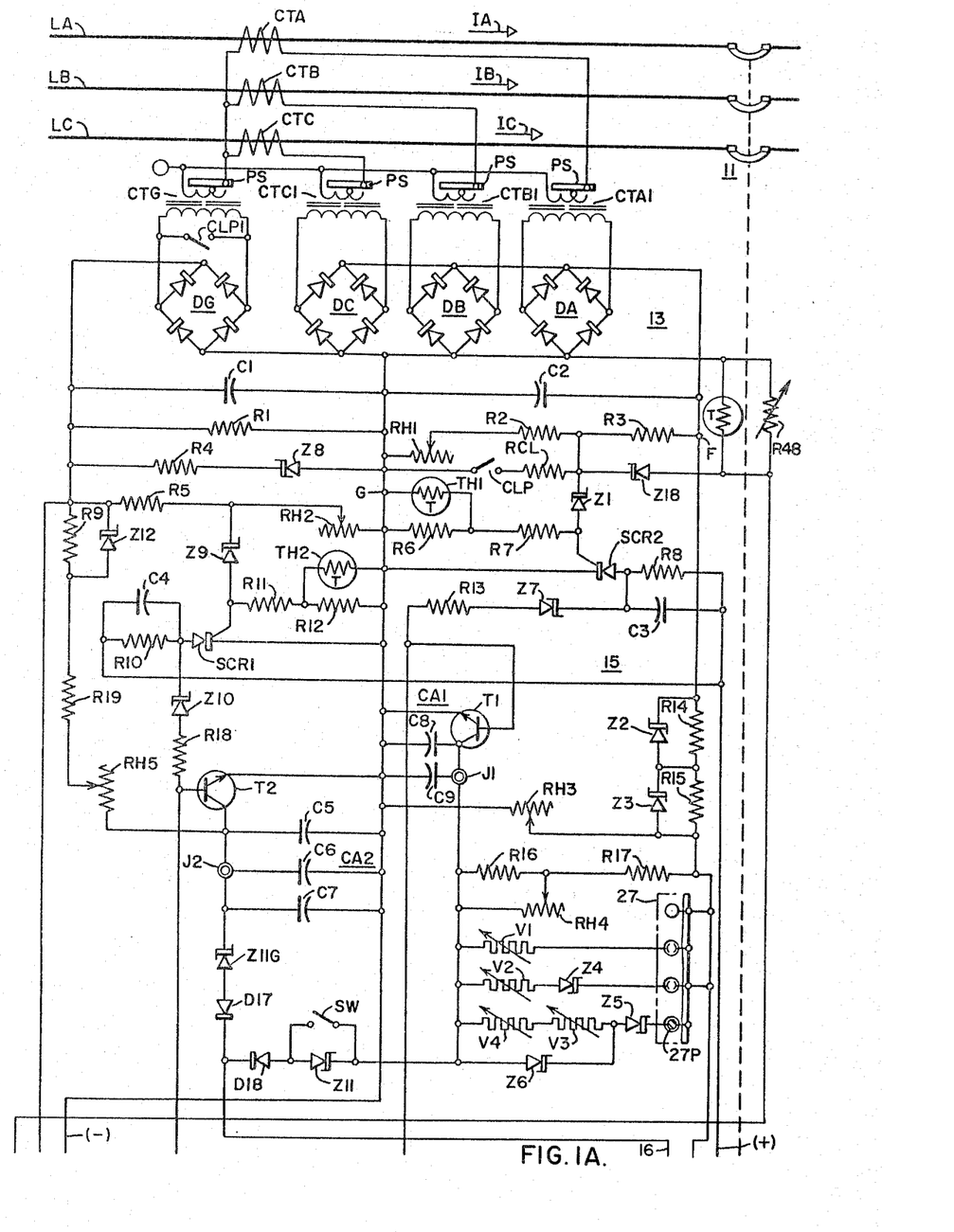
FIGURES 1A, 1B and 1C, collectively, represent a schematic view of an electric system embodying the invention (FIG. 1B should be placed below FIG. 1A and FIG. 1C should be placed below FIG. 1B).
Figure 1B:
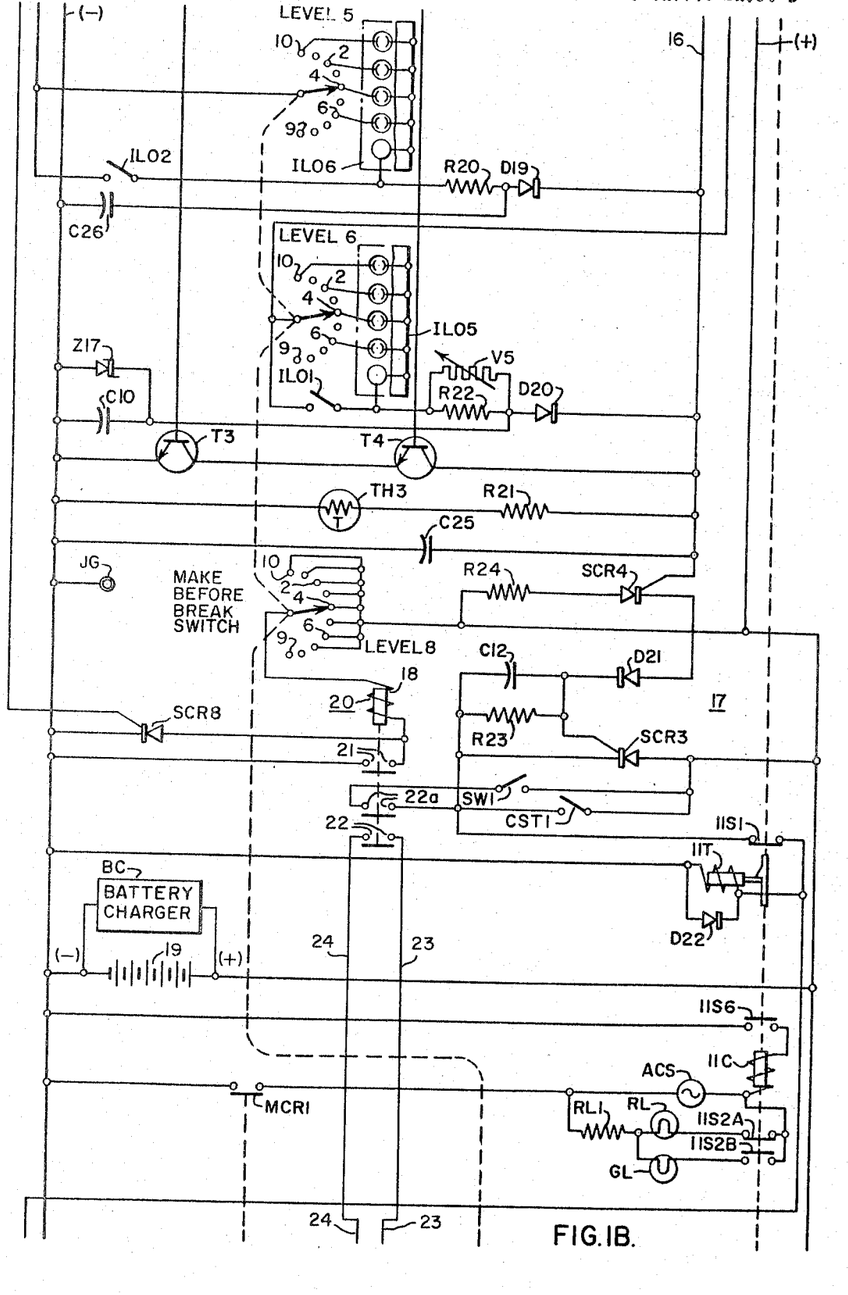
Figure 1C:
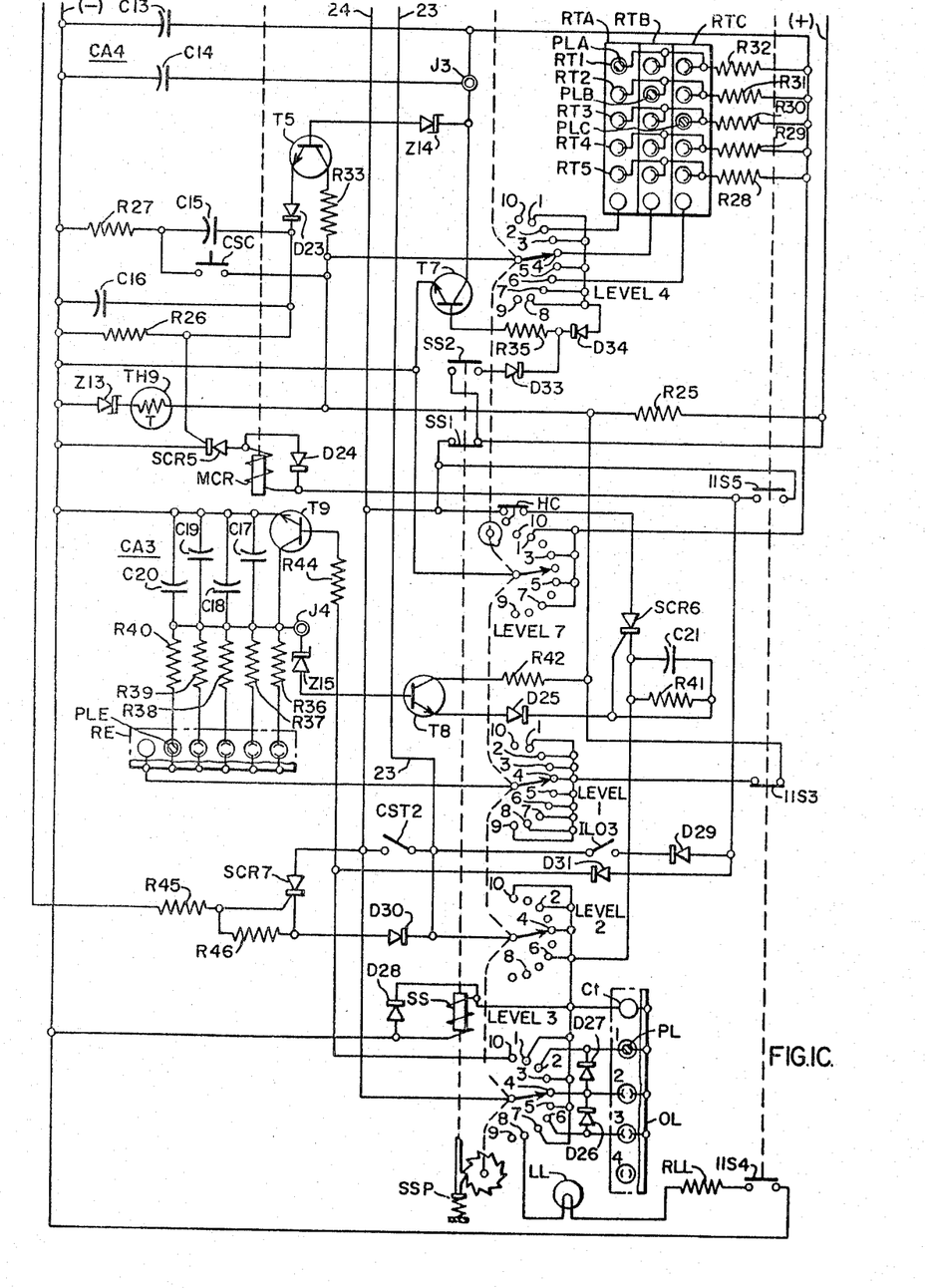

FIGS. 1A, 1B and 1C show a reclosing-circuit breaker combination which is associated with an electric system to be protected. This system may be of any type having a condition to which the combination is to respond. For present purposes, it will be assumed that the system is a three-phase system operating at a power frequency of 60 cycles per second and represented by three-phase or line conductors LA, LB and LC. These line conductors transmit alternating currents IA, IB and IC, respectively, from a suitable source to a load through a circuit breaker 11 having a closing motor 11C and a trip coil 11T. The circuit breaker has three auxiliary switches 11S1, 11S2A and 11S3 which are open when the circuit breaker is in open condition and which are closed when the circuit breaker is in closed condition. The circuit breaker 11 is shown in its closed condition.

The circuit breaker has four auxiliary switches 11S2B, 11S4, 11S5 and 11S6. These switches are closed when the circuit breaker is in open condition and are open when the circuit breaker is in closed condition.

The reclosing-circuit-breaker combination is designed to a suitable condition of the electric system which is to be protected. In a preferred embodiment of the invention the combination comprises an overcurrent relay assembly which responds to currents flowing through the line conductors.

The relay assembly includes a converter unit 13 which derives from the phase currents IA, IB and IC a direct voltage which is applied between points F and G and which is dependent on the largest of the three line currents. This direct voltage is applied to a timing unit 15 for the purpose of controlling the charging of a capacitor unit CA1 which may include one or more capacitors, in the illustrated case capacitors C8 and C9. When the voltage across the capacitor unit CA1 exceeds a predetermined value, a signal is applied to a tripping unit 17 for the purpose of initiating a tripping operation of the circuit breaker 11.

By inspection of FIG. 1A, it will be noted that three current transformers CTA, CTB and CTC have primary windings energized in accordance with the line currents LA, LB and LC, respectively. The secondary windings of the current transformers CTA, CTB and CTC are respectively connected to the primary windings of transformers CTA1, CTB1 and CTC1 located in the converter unit 13. Preferably the primary windings of the current transformers CTA1, CTB1 and CTC1 have adjustable numbers of turns selected by suitable plug and socket assemblies PS to facilitate adjustment of the relay assembly.

The secondary windings of the transformers CTA1, CTB1 and CTC1 are connected to the input terminals of rectifiers DA, DB and DC respectively. The output terminals of the rectifiers are connected in parallel across a voltage divider represented by three resistors R3, R2 and RH1. For the purpose of calibration at least one of these resistors, such as the resistor RH1, preferably is adjustable. A filter capacitor C2 is connected across the output terminals of the rectifiers for the purpose of removing ripple from the output and assuring the supply of a ripple-free direct voltage across the voltage divider. The parallel connection of the rectifier outputs results in a voltage across the voltage divider corresponding to the largest of the three input voltages to the rectifiers.

In the timing unit 15, the direct voltage appearing across the voltage divider is employed for charging a storage device such as the capacitor unit CA1. This direct voltage is applied across an adjustable resistor RH3 through resistors R14 and R15, and is applied across the capacitor unit CA1 through the resistor R17 and through the parallel resistors R16 and RH4. At least one of the resistors R16 and RH4 preferably is adjustable to facilitate calibration. Thus, adjustment of the resistor RH4 adjusts the rate of charge of the capacitor unit CA1 and the time required for the capacitor to reach a predetermined terminal voltage. The time also may be adjusted by adjustment of the capacitance of the capacitor unit CA1.

For values of the line currents below fault values the capacitor unit CA1 should remain discharged. For this purpose the unit CA1 is shunted by a suitable switch which preferably takes the form of the output circuit of a transistor T1. The input or control circuit for the transistor may be traced from the positive terminal having a positive polarity marking (+) of a source of direct voltage 19 (FIG. 1B) through a resistor R8 (FIG. 1A), a minimum voltage or threshold device such as a Zener diode Z7, a resistor R13, the base of the transistor T1, and the emitter of the transistor to the negative terminal of the source of direct voltage 19 represented by a negative polarity marking (—). A 24 volt battery may be employed as the source 19.

When the capacitor unit CA1 is to start a timing operation, a switch is closed to shunt the input or control circuit of the transistor T1. This turns the transistor T1 off and permits the capacitor unit CA1 to charge. The shunting of the transistor preferably is by a silicon-controlled rectifier SCR2. This controlled rectifier has its anode connected to a point intermediate the resistor R8 and the Zener diode Z7. The controlled rectifier has a cathode connected to the emitter of the transistor T1. The gate of the controlled rectifier is connected to a point intermediate the resistors R2 and R3 through a minimum voltage or threshold device Z1.

For low values of voltage thereacross, the minimum voltage device Z1 is in effect an insulator and blocks the flow of current therethrough. When the voltage thereacross rises above a predetermined value the device Z1 breaks down to exhibit a relatively low resistance to the flow of current. When the voltage thereacross drops below the predetermined value, the device Z1 recovers its insulating properties. In a preferred embodiment of the invention, this device takes the form of a Zener diode. Resistors R6 and R7 are connected in series between the gate and cathode of the controlled rectifier SCR2. A capacitor C3 is connected across the resistor R8 and the values of the components are selected to enable the silicon-controlled rectifier to turn off and on depending on the signal at the gate of the controlled rectifier. To indicate suitable parameters, the controlled rectifier is designed for an output current of the order of 200 milliamperes. The resistor R8 has a resistance of 27,000 ohms and the capacitor C3 has a substantial capacitance such as 47 microfarads.

The operation of the timing unit now will be briefly reviewed. It will be assumed that the values of line currents flowing are too small to result in "turn-on" the controlled rectifier SCR2. Because of the current flowing from the positive terminal of the source 19 through the resistor R8, the Zener diode Z7, the resistor R13, the base and emitter of the transistor T1 to the negative terminal of the source of direct voltage, the transistor T1 is turned on and establishes a low-resistance path across the capacitor unit CA1. Consequently, the capacitor unit CA1 is in discharged condition.

It will be assumed next that the line current IA increases until it reaches fault values. As the current increases, a stage is reached at which the voltage across the Zener diode Z1 breaks down the diode and current flows from an intermediate terminal of the voltage divider through the Zener diode Z1 and the resistors R7 and R6 back to the left-hand terminal of the voltage divider. The voltage drop across the resistors R7 and R6 turns on the controlled rectifier SCR2 and current now flows from the positive terminal of the source of direct voltage through the resistor R8, and the anode and cathode of the controlled rectifier to the negative terminal of the source of direct voltage.

Because of the low voltage now appearing between the anode and cathode of the controlled rectifier SCR2, the voltage across the Zener diode Z7 drops below the value required to maintain conduction therethrough and the current flowing through the base-emitter circuit of the transistor T1 drops to turn off the transistor. Since the transistor T1 now represents a high resistance across the capacitor unit CA1 this capacitor starts to charge.

The voltage across the capacitor unit increases until a minimum voltage device Z11 breaks down. This minimum voltage device may be similar in construction to the device Z1. When the device Z11 breaks down the timing unit 15 delivers an input to the tripping unit 17 through a rectifier D18 and a conductor 16.

If the sharp-breakdown point of the device Z11 is not desired, the device may be, and in a preferred embodiment is, shunted by a manually-operated switch SW.

Let it be assumed now that the line current IA starts to drop either after or before the capacitor unit CA1 is charged sufficiently to result in break down of the device Z11. When the line current drops to a predetermined value, the Zener diode Z1 is restored to its blocking condition and the controlled rectifier SCR2 turns off.

Inasmuch as the controlled rectifier SCR2 is in blocking condition sufficient current flows from the positive terminal of the battery 19 through the circuit represented by the resistor R8, the Zener diode Z7, the resistor R13 and the base and emitter of the transistor T1 to turn on the transistor. The transistor now establishes a low-resistance shunt across the capacitor unit CA1 and the capacitor unt CA1 is rapidly discharged through the transistor. This completes a cycle of operation of the timing unit 15.

When the timing unit 15 delivers an input to the tripping unit 17 (FIG. 1B) the tripping unit trips the circuit breaker 11. This tripping unit is energized from a source of direct voltage such as the battery 19.

The trip coil 11T of the circuit breaker 11 is connected across the source of direct voltage 19 through the auxiliary switch 11S1 and a control switch SCR3 which is closed when the circuit breaker is to be tripped. Preferably the switch SCR3 is a silicon-controlled rectifier similar to the controlled rectifier SCR2. The output circuit of the controlled rectifier SCR3 may be traced from the positive terminal (+) of the source of direct voltage 19 through the anode and cathode of the controlled rectifier SCR3, the auxiliary switch 11S1 and the trip coil 11T to the negative terminal (—) of the source of direct voltage. A resistor R23 and a capacitor C12 are connected in parallel across the gate and cathode of the controlled rectifier.

When the controlled rectifier SCR3 is to be fired a switch SCR4 is closed which connects the positive terminal of the battery 19 through a resistor R24, the anode and cathode of the controlled rectifier SCR4, a rectifier D21, the resistor R23, the auxiliary switch 11S1 and the trip coil 11T to the negative terminal of the battery. Sufficient current passes through this circuit to produce a voltage across the resistor R23 which fires the controlled rectifier SCR3 and this controlled rectifier connects the trip coil 11T across the source of direct voltage through the auxiliary switch 11S1 to assure tripping of the circuit breaker. The capacitor C12 establishes a by-pass circuit for alternating current components across the resistor R23.

Preferably the switch SCR4 takes the form of a silicon-controlled rectifier similar to the controlled rectifier SCR2. As shown in FIG. 1B, the anode of the controlled rectifier SCR4 is connected through the resistor R24 to the positive terminal of the battery 19 whereas the cathode is connected through the rectifier D21, the network comprising the resistor R23 and capacitor C12, switch 11S1, and winding or coil 11T to the negative bus. The gate of the controlled rectifier SCR4 is connected through resistors R21 and TH3 to the negative terminal of the battery 19.

The capacitor C25, which is normally maintained in a discharged condition by the normally conducting transistors T3 and T4, must charge before the gate current can fire the rectifier SCR4. The charging time of the capacitor C25 assures a slight time delay in the firing of the controlled rectifier SCR4 to prevent firing of the controlled rectifier by a brief transient. The two transistors T3 and T4 have their collectors and emitters connected in series across the capacitor C25 and their bases connected to the bases of the transistors T2 and T1, respectively. Consequently, when the transistor T1 turns on to discharge the capacitor unit CA1 the transistor T4 turns on to discharge the capacitor C25 (assuming that the transistor T3 is turned on which is the case if the zero-sequence current magnitude is below a critical value as will be described below).

When the transistor T1 turns off to permit a timing operation, the transistor T4 also turns off to place the capacitor C25 associated with the controlled rectifier SCR4 in effective charging condition. When the Zener diode Z11 breaks down the capacitor C25 charges and current flows from the capacitor unit CA1 through the resistors R21 and TH3. The voltage drop across these resistors supplies an input or control current to the silicon-controlled rectifier SCR4 through a circuit which may be traced from the right-hand terminal of the resistor R21 through the gate and cathode of the controlled rectifier SCR4, the rectifier D21, the resistor R23, the auxiliary switch 11S1 and the trip coil 11T to the left-hand terminal of the resistor TH3. Although this current may be insufficient to operate the controlled rectifier SCR3 or to trip the circuit breaker it suffices to turn on the controlled rectifier SCR4 and this assures firing of the controlled rectifier SCR3 in the manner previously discussed.

In opening, the circuit breaker 11 interrupts the flow of line current. Consequently, the voltage across the voltage divider R3, R2 and RH1 drops to zero. This turns off the controlled rectifier SCR2. Inasmuch as the controlled rectifier SCR2 is turned off sufficient current now flows through the emitters of the transistors T1 and T4 to turn on these transistors. These transistors promptly discharge the capacitor unit CA1 and the capacitor C25 (assuming that the transistor T3 is conducting).

As a result of the opening of the switch 11S1 of the circuit breaker 11, the currents flowing through the output circuits of the controlled rectifiers SCR3 and SCR4 drop and the gates of these controlled rectifiers regain control. The controlled rectifiers SCR3 and SCR4 return to their off conditions.

In relay design it is desirable to match certain curves or to provide a predetermined relation between certain variable quantities such as the relation between the line current and the ouput of the timing unit. For example, such matching is desirable in order to insure proper coordination among relays employed for protecting an electrical system. These curves are illustrated in the copending application Ser. No. 200,129, filed June 5, 1962, for Circuit Controlling Systems by Nathaniel D. Tenenbaum and Gino J. Marieni and assigned to the same assignee as is this application. The curve obtaining structure comprises the resistors R14–17, RH3, RH4, V1–V4 and the Zener diodes Z2–6 and is described in detail in said copending application. A number of different curves may be obtained depending upon the location of the plug 27P in the curve selector switch panel 27.

A further control of curve shapes is provided by the connection of a capacitor C10 (FIG. 1B) and a Zener diode Z17 in parallel between the negative terminal of the battery 19 and a point intermediate the rectifier D20 and the resistor 22.

When the voltage across the capacitor C10 exceeds a predetermined value the Zener diode Z17 breaks over to limit the voltage applied to the gate of the controlled rectifier SCR4.

In certain cases, it is desirable to provide a rapid tripping operation of the circuit breaker 11. A suitable characteristic curve for such cases is shown by the curve P1 in FIG. 2 of the said copending application. For present purposes, it will be assumed that such rapid operation is provided by closure of a manually-operated switch ILO1 (FIG. 1B). When this switch is closed, the voltage across the resistor RH3 is applied across the resistors R21 and TH3 through a varistor V5 and a resistor R22 in parallel and through the rectifier D20. This, in effect, by-passes the capacitor unit CA1 and thus permits a rapid tripping operation when the voltage across the resistors R21 and TH3 is sufficient to fire the silicon-controlled rectifier SCR4. For a fault current, the transistor T4 is turned off in the manner previously described to permit a firing operation of the silicon-controlled rectifier SCR4.

For some applications, it is desirable to provide a tripping operation of the circuit breaker 11 in response to line current or zero-sequence current flowing in the protected polyphase system. In the specific embodiment of FIG. 1, a transformer CTG has its adjustable primary winding connected in the residual circuit of the current transformers CTA, CTB and CTC for energization in accordance with the zero-sequence current of the protected system. The secondary winding of the transformer CTG is connected across the input terminals of a full-wave rectifier DG which is assumed to be of the bridge type. The output voltage of the rectifier is applied across a resistor R1 and is filtered by a capacitor C1. The same voltage appears across a resistor R4 and a minimum voltage or threshold device Z8 in series and across a voltage divider comprising the resistors R5 and RH2 in series. The minimum voltage device Z8 may be a Zener diode. The resistor RH2 is shown to be adjustable. As the voltage output of the rectifier DG increases, a point is reached at which the minimum voltage device Z8 breaks down to render the resistor R4 effective for loading the rectifier.

The voltage output of the voltage rectifier DG is applied across a capacitor unit CA2 through resistors R9, R19 and RH5. The capacitor unit may include one or more capacitors, three capacitors C5, C6 and C7 being shown in parallel in FIG. 1A. The resistor RH5 has an adjustable resistance.

It will be noted that a minimum-voltage or threshold device which preferably is a Zener diode Z12 is connected across the resistor R9. As the current through the resistor increases, the voltage across a resistor reaches a value sufficient to break down the Zener diode. Thus, for larger values of current the resistor R9 has no effect on the charging characteristics.

For low values of zero-sequence current, the capacitor unit CA2 is maintained in a discharged condition by a suitable controlled switch such as a transistor T2. The transistor T2 has its output circuit connected across the capacitor unit CA2. A current sufficient to maintain the transistor T2 turned on is supplied to the input circuit of the transistor through a circuit which may be traced from the positive terminal of the source of direct voltage 19 through a resistor R10, a Zener diode Z10, a resistor R18 and the base and emitter of the transistor T2 to the negative terminal of the source.

When the capacitor unit CA2 is to start a timing operation, a switch is closed to shunt the input or control circuit of the transistor T2. This turns the transistor T2 off and permits the capacitor unit CA2 to charge. The shunting of the transistor preferably is by a silicon-controlled rectifier SCR1. This controlled rectifier has its anode connected to a point intermediate the resistor R10 and the Zener diode Z10. The controlled rectifier has a cathode connected to the emitter of the transistor T2. The gate of the controlled rectifier is connected to a point intermediate the resistors RH2 and R5 through a minimum-voltage or threshold device such as a Zener diode Z9. Resistors R11 and R12 are connected between the gate and cathode of the controlled rectifier SCR1. To facilitate turn off of the controlled rectifier, a capacitor C4 is connected across the resistor R10.

A transistor T2 and the silicon-controlled rectifier SCR1 cooperate to control the charge and discharge of the capacitor unit CA2 in a manner which will be understood from the discussion of the control of the charge and discharge of the capacitor unit CA1 by the transistor T1 and the controlled rectifier SCR2. Although shaping components similar to those employed with the capacitor unit CA1 may be associated with the capacitor unit CA2 a less complicated shaping control suffices for the capacitor unit CA2. Thus, in FIG. 2 of the said copending application, the curve GTD represents a suitable characteristic curve for the charging of the capacitor unit CA2.

The voltage across the capacitor unit CA2 is applied across the resistors R21 and TH3 through a minimum voltage or threshold device, such as a Zener diode Z11G, and a rectifier D17. As this voltage increases a value is reached at which the Zener diode breaks down to supply current to the resistors R21 and TH3.

If the system of FIGS. 1A, 1B and 1C is not to be employed in a substantially constant-temperature environment, compensation preferably is provided in certain circuits such as the gate circuits of the more critical controlled rectifiers for variation in properties due to temperature changes. Thus to compensate for the variation in response of the controlled rectifier SCR1 with temperature all or a substantial part of the resistance between the gate and cathode of the controlled rectifier may be replaced by a material having a negative temperature coefficient of resistance such as a thermistor. In the specific embodiment of FIG. 1A, a thermistor TH2 is connected across the resistor R12. For similar reasons, a thermistor TH1 is connected across the resistor R6 and the thermistor TH3 is connected in series with the resistor R21. Also, all or part of the resistor R16 may be replaced by a material having a negative temperature coefficient of resistance such as a thermistor.

It is sometimes desirable to provide a rapid tripping operation of the circuit breaker 11 in response to zero-sequence current. For example, a suitable characteristic curve GI is shown in FIG. 2. To illustrate equipment for producing such a characteristic curve, it will be assumed for present purposes that a manually-operated switch ILO2 is in closed condition. This applies the output voltage of the rectifier DG across the resistors R21 and TH3 through a resistor R20 and a rectifier D19. As the voltage output of the rectifier DG increases, a value is reached at which the transistor T3 is turned off to render the input circuit for the controlled rectifier SCR4 effective and the circuit breaker 11 then trips. A time delaying capacitor C26 is connected from the negative battery terminal to a point intermediate the resistor R20 and the rectifier D19 to prevent firing of the controlled rectifier SCR4 by brief transients.

The pattern of tripping and closing operations of the circuit breaker 11 is determined by an indexing device or stepping switch which may be of either static or electromechanical construction. In the specific embodiment of FIGS. 1A, 1B and 1C, the stepping switch is of electromechanical construction and includes an operating coil SS, seven levels of contacts, a homing contact HC which is open only when the stepping switch is in a reset or home position, and two stepping contacts SS1 and SS2. Although the stepping switch may have any desired number of positions, it will be assumed that it has ten positions as shown in FIGS. 1B and 1C. In its reset or home condition the stepping switch occupies position 10 wherein the movable brush for each level engages the contact 10 for such level. The number 8 position of the stepping switch is the lockout position wherein each movable brush of a level engages the contact 8 for such level. For example, the brush for level 3 engages the associated contact 8 to complete an energizing circuit from the positive terminal of the battery 19 through the contacts SS1 of the stepping switch and the brush and contact member 8 of level 3 of the stepping switch, the lockout light LL, a resistor RLL, and the auxiliary switch 11S4 of the circuit breaker 11 to the negative terminal of the battery. The illumination of the lockout light LL indicates that the circuit breaker 11 is locked out and thus prevented from reclosing automatically.

A rectifier D22 is connected across the coil of the trip coil 11T in order to permit discharge of energy stored in this coil when the coil is deenergized.

For each brief energization of the trip coil 11T an electric pulse is delivered to the operating coil SS of the stepping switch for the purpose of stepping the stepping switch to the next position. It will be noted that a rectifier D28 is connected in a conventional manner across the coil SS to permit discharge of energy stored in the coil after the coil is deenergized.

Let it be assumed that the stepping switch is in position 10 at the time the circuit breaker 11 trips. The energization of the trip coil 11T is accompanied by energization of the control circuit of a switch SCR7, which conveniently may be a silicon-controlled rectifier, through a circuit which may be traced from the positive terminal of the battery 19 through the anode and cathode of the controlled rectifier SCR3, the auxiliary switch 11S1, resistors R45 and R46, a rectifier D30, the brush and contact 10 of the second level, and the coil SS to the negative terminal of the battery 19.

The voltage across the resistor R46 is applied between the gate and cathode of the controlled rectifier SCR7. The controlled rectifier fires to connect the coil SS across the battery 19 through the break contacts SS1 of the stepping switch, the anode and cathode of the controlled rectifier SCR7, the rectifier D30, the brush and contact 10 of the second level, and the coil SS to the negative potential bus. The energized coil SS lowers its armature, as viewed in FIG. 1C, to cock the spring SSP and to open its make contacts SS1. Upon opening, the contacts SS1 deenergize the coil SS and the spring SSP resets the armature to advance the stepping switch one position. The integrator coil SS now is energized through the contacts SS1 and the brush and contact 1 of level 3 to advance the stepping switch to its position 2. In this way, the stepping switch automatically steps from each odd position to the next even position.

In position 2 of the stepping switch the brush engages contact 2 of the third level. A panel OL is provided with common terminal CT and a number of openings 1, 2, 3 and 4. When a plug PL is in the opening 1, the contact 2 of the third level of the stepping switch is connected through the plug to the upper terminal of the switch coil SS. In a similar manner, the plug may be inserted in openings 2 or 3 to connect contacts 4 or 6 of this level respectively to the upper terminal of the integrator coil. The opening in which the plug is inserted determines the number of tripping operations permitted for the circuit breaker before the circuit breaker locks out. It will be noted that a rectifier D26 is connected between the contacts 4 and 6 and that a rectifier D27 is connected between the contacts 2 and 4 of the third level of the stepping switch.

As the stepping switch steps from position 1 to position 2, the contacts SS1 momentarily open. If the plug PL is located in opening 1 of the panel OL, the reclosure of the contacts SS1 reenergizes the integrator coil SS to step the stepping switch to position 3 again momentarily opening the contacts SS1. The reclosure of the contacts SS1 steps the stepping switch to its position 4 in a manner which will be clear from the preceding discussion. The reclosure of the contacts SS1 as the stepping switch reaches its position 4 completes with the brush and contact 4 of the third level, the rectifier D27 and the plug PL a reenergizing circuit for the integrator coil SS and the stepping switch promptly steps to its position 5. Closure of the contacts SS1 steps the stepping switch to its position 6 by a sequence similar to that followed in stepping from position 1 to position 2.

When the brush reaches the contact member 6 of level 3 of the stepping switch, the reclosure of the contacts SS1 again completes an energizing circuit for the integrator coil through the brush and contact 6 of the third level, the rectifiers D26 and D27, and the plug PL. This steps the stepping switch to its position 7 from which the stepping switch automatically steps to position 8, the lockout position wherein the lockout light LL is illuminated.

Thus, insertion of the plug PL in the opening 1 has limited the circuit breaker to one tripping operation before lockout. In an analogous manner, insertion of the plug in opening 2 or opening 3 of the panel OL restricts the circuit breaker to two or three tripping operations respectively before lockout.

The time delay in reclosure of the circuit breaker for each operation in which reclosure is called for is determined by a capacitor unit CA4 and its associated charging circuit. The capacitor unit CA4 includes one or more capacitors, and capacitors C13 and C14 are illustrated as connected in parallel to form the capacitor unit CA4.

The time delay introduced by the reclose timer depends on which of five resistors R32, R31, R30, R29, or R28 is selected for controlling the charging of the capacitor unit CA4. Inspection of FIG. 1C shows that the right-hand terminal of each of the resistors is connected to the right-hand terminal of the capacitor unit CA4. The left-hand terminals of the resistors are connected respectively to five connection screw sockets RT1, RT2, RT3, RT4 and RT5 located on each of three conductive reclose timer panels or tap blocks RTA, RTB and RTC. Each of the contacts 2, 4 and 6 of the fourth level of the stepping switch is connected to a separate one of the three panels RTA, RTB and RTC. Plugs PLA, PLB and PLC are associated respectively with the panels RTA, RTB and RTC for connecting each of the contacts 2, 4 and 6 to any of the resistors R28 to R32.

As representative of suitable parameters, the resistor R32 may have a small value of resistance to provide rapid reclosure and the resistors R31, R30, R29 and R28 may introduced time delays of the order of 2, 15, 30 or 45 seconds respectively. It will be noted that the brush of the fourth level of the stepping switch connects any contact of the level which it engages through a resistor R25 to the positive terminal of the battery 19.

When the brush engages any of the contacts 1, 3, 5, 7 or 8 of the fourth level of the stepping switch, the transistor T7 is turned on to assure complete discharge of the capacitor unit CA4. For example, when the brush engages the contact 1 current flows from the positive terminal of the battery 19 through the resistor R25, the brush and contact 1 of the fourth level, the rectifier D34, the resistor R35 and the base and emitter of the transistor T7 to the negative terminal of the battery. In turning on, the transistor assures discharge of the capacitor unit before the next charging operation thereof. As further assurance of full discharge of the capacitor unit CA4 contacts 1, 3, 5 and 7 of the seventh level of the stepping switch are connected to the right-hand terminal of the capacitor unit CA4 whereas the brush for this level is connected to the left-hand terminal of the capacitor unit as shown in FIG. 1C.

When the brush engages any of the contacts 2, 4 or 6 of the fourth level, the capacitor unit CA4 starts to charge at a rate determined by the position of the plug PLA, PLB or PLC associated with the selected contact. When the voltage across the capacitor unit CA4 reaches a value sufficient to break down a minimum voltage device such as a Zener diode Z14, current is supplied to the input circuit of a transistor T5 for the purpose of turning the transistor on through a circuit which may be traced from the right-hand terminal of the capacitor unit through the Zener diode Z14, the base and emitter of the transistor T5, a rectifier D23 and a resistor R26 to the left-hand terminal of the capacitor unit. A transient suppression capacitor C16 is connected across the resistor R26.

Inasmuch as the transistor T5 is now turned on, current flows from the positive terminal of the battery 19 through the resistor R25, a resistor R33, the collector and emitter of the transistor T5, the rectifier D23 and the resistor R26 to the negative terminal of the battery.

The resistor R26 is in the input circuit of a silicon-controlled rectifier SCR5 and the voltage across the resistor now is sufficient to turn on the controlled rectifier. Current is now supplied to a motor close relay MCR from the positive terminal of the battery 19 through the contacts SS1, the auxiliary switch 11S5 of the circuit breaker 11, the motor close relay MCR and the anode and cathode of the controlled rectifier SCR5 to the negative terminal of the battery 19. The motor close relay MCR closes its contacts MCR1 to complete with the auxiliary switch 11S6 of the circuit breaker 11 an energizing circuit for the closing motor 11C of the circuit breaker. This closing motor may be energized from any suitable source such as a 240 volt alternating-current source ACS. A rectifier D24 is connected across the motor close relay MCR in a conventional manner to discharge energy stored in the coil when the coil is deenergized.

If the circuit breaker 11 remains closed after any reclosure for a predetermined length of time, a reset timer, timed by the capacitor unit CA3, operates to reset the stepping switch. The capacitor unit CA3 is normally maintained discharged by the normally conductive transistor T9. Normally the stepping switch is in a position to maintain the brush and contact 10 of level 3 of the stepping switch in engagement to complete an energizing circuit for the base-emitter circuit of a transistor T9 through a resistor R44 and the contacts SS1. The capacitor unit may comprise any number of capacitors. In the specific embodiment of FIG. 1C, for capacitors C17, C18, C19 and C20 are shown.

The upper terminals of five resistors R36, R37, R38, R39 and R40 are all connected to the lower terminal of the capacitor unit CA3. The lower terminals of the resistors are connected respectively to connection screw sockets of a tap block or conductive panel RE having a manually-operated plug PLE which may be inserted to connect any of the lower terminals of the resistors to the brush of level 1 of the stepping switch. The contacts 1 to 9 for this level are connected through the auxiliary switch 11S3 and the transistor R25 to the positive potential bus. The voltage applied by the level 1 brush to the R/C timing network is held constant by a constant-voltage device such as a Zener diode X13 which is connected between resistor R25 and the negative terminal of the battery 19. If desired, a resistor TH9 which may have a negative temperature coefficient of resistance to compensate for changes with temperature of the voltage needed to fire the controlled rectifier SCR6 may be connected in series with the Zener diode Z13 so that the voltage across the Zener diode is substantially constant irrespective of temperature changes.

The five resistors connected to the capacitor unit CA3 have resistance values selected to provide desired time delays for the reset timer. For example, the resistors R40, R39, R38, R37 and R36 may be selected to provide respectively delays of 10, 30, 60, 90 and 120 seconds.

After a tripping operation of the circuit breaker 11, the brush of level 3 of the stepping switch is displaced from the contact 10 and is no longer effective for establishing a discharge circuit for the capacitor unit CA3. However, each time the contacts SS1 close, a circuit is established from the positive battery terminal or bus through the contacts SS1, the auxiliary switch 11S5, the rectifier D31, the resistor R44 and the base-emitter circuit of the transistor T9 to the negative battery terminal to turn on the transistor T9 and thus assure that the capacitor unit CA3 is discharged prior to any reclosure of the breaker 11. When the circuit breaker recloses the auxiliary switch 11S5 opens and turns off the transistor T9. Closure of the contacts 11S3 completes the charging circuit of the capacitor unit CA3.

The capacitor unit CA3 now charges at a rate determined by the selected resistor until the voltage becomes sufficient to breakover a minimum voltage device such as a Zener diode Z15. If the fault which initiated the operation of the circuit breaker clears itself and the reclosed breaker remains closed, the capacitor unit CA3 will charge to a sufficiently high voltage to cause the diode Z15 to breakover. When this occurs, the capacitor unit CA3 causes current through a circuit which may be traced from the lower terminal of the capacitor unit CA3 through the Zener diode Z15, the base and emitter of a transistor T8, a rectifier D25, a resistor R41 and the coil SS back to the upper terminal of the capacitor unit. The current flowing in this circuit is insufficient to operate the integrator coil SS or to turn on a switching device such as a silicon-controlled rectifier SCR6 which has the resistor R41 and a transient suppression capacitor C21 in its input circuit.

This base current in the transistor T8 permits collector current to flow from the positive terminal of the battery 19 through the resistor R25, the resistor R42, the collector and emitter of the transistor T8, the rectifier D25, the resistor R41, and the coil SS to the negative terminal of the battery 19. This current together with the base current is still insufficient to operate the integrator coil SS but is sufficient to fire the controlled rectifier SCR6 to complete a circuit from the positive terminal of the battery 19 through the contacts SS1 of the stepping switch, homing contacts HC, the anode and cathode of the controlled rectifier SCR6 and the coil SS to the negative terminal of the battery 19 and sufficient current to actuate the stepping switch flows. The homing contacts HC are cam-operated by the stepping switch and open only when the switch is in the home or reset position. As the stepping switch steps to its next position, the contacts SS1 open to deenergize the coil SS and thereafter reclose to reenergize the coil SS for another stepping operation. As a result of this self-stepping operation, the stepping switch continues to step until it reaches position 10 wherein the homing contacts HC open and the recloser control is completely reset for future tripping and reclosing operations.

It will be recalled that closure of the switches ILO1 and ILO2 (FIG. 1B) conditions the system for a prompt tripping operation. These switches are a part of a three-pole signal-throw switch unit which includes a switch ILO3 (FIG. 1C). When the switch unit is operated for lockout purposes, closure of the switch ILO3 prepares an energizing circuit for the integrator coil SS which may be traced from the positive terminal of the battery 19 through the self-stepping contacts SS1, the auxiliary switch 11S5, a rectifier D29, the switch ILO3, the brush and a contact (assumed to be contact 10) of level 2 of the stepping switch and the integrator coil SS to the negative terminal of the battery. Tripping of the circuit breaker closes the auxiliary switch 11S5 to complete a self-stepping circuit for the stepping switch which now steps to its number 8 or lockout position.

By inspection of FIG. 1B, it will be noted that the switch ILO1 is connected to shunt out level 6 of the stepping switch. Each of the even numbered contacts of this level may be selectively connected to the conductor 16 through resistor R22 and diode D20 by means of a plug, similar to the plug 27P of the panel 27, inserted into the switch panel ILO5 at the desired location. Consequently (if the plug of the panel ILO5 is in one of the sockets such as that corresponding to position 4 of the stepping switch and the switch ILO1 is open), the stepping switch, when it reaches its fourth position, conditions the circuit breaker for a prompt tripping operation since the conductor 16 will be energized directly, through the diode D20, by the potential across the resistor RH3 thereby eliminating the time required to charge the capacitor unit CA1. When switch ILO1 is closed the more rapid operation will occur for all actuations of the breaker 11. A similar prompt tripping operation is provided by the switch ILO2 and the switch panel ILO6 for zero-sequence producing faults.

Remote control for tripping the circuit breaker is provided by a switch unit including a switch CST1 (FIG. 1B) and a switch SCT2 (FIG. 1C). Closure of the switch CST1 connects the trip coil of the circuit breaker across the battery 19 through the auxiliary switch 11S1 to trip the circuit breaker. The subsequent reclosure or sequencing of the breaker 11 which normally would occur when the apparatus is set for a reclosing sequence is prevented by closure of the switch CST2. As indicated by the reference characters, the switches CST1 and CST2 are preferably mechanically coupled together for concurrent actuation. Closure of the switch CST2 connects the coil SS of the stepping switch through its level 2 brush and it contacts SS1 across the battery 19. This causes the stepping switch to continuously step to its number 8 step where, because of the absence of a connection to the number 8 contact of level 2, further stepping of the stepping switch will cease with the breaker 11 in open circuit condition. The stepping switch is stepped from the even numbered positions by the level 2 position and from the odd numbered positions by the level 3 position.

In the event of a fault current magnitude in excess of a predetermined magnitude, it is often desirable to open the breaker 11 in the quickest possible time and to omit any subsequent reclosure thereof. This rapid opening and omission of the normal sequencing of the breaker 11 prevents the equipment from being subjected to heavy fault interruptions which could unnecessarily damage the electrical equipment involved and considerably outweighs the desirability of sequencing since the probability that faults which produce excessive fault currents will correct themselves is small. As described above when a line-to-line fault occurs, a voltage is established between the points F and G which is proportional to the magnitude of the fault current. When the fault current magnitude exceeds a selected value the voltage appearing across the Zener diode Z18 exceeds its breakover value and current then flows therethrough and through the resistor R48. The resulting voltage across the resistor R48 is applied between the gate and cathode of a controlled rectifier SCR8 having its anode-cathode circuit connected in series with the winding 18 of a magnetic relay 20 and level 8 of the stepping switch SS between the positive and negative power busses.

The relay 20 is provided with locking contacts 21 connected in shunt with the rectifier SCR8. This insures that the relay 20, when once energized, will remain energized until the stepping switch SS has stepped to its lockout position, which as set forth above, is step number 8. The relay 20 is also provided with external circuit controlling contacts 22 and 22a. The contacts 22 are connected in shunt with the switch CST2 (FIG. 1C) by the conductors 23 and 24 while the contacts 22a are connected in shunt with the switch CST1. The closure of the contacts 22, as explained above in connection with the closure of the switch CST2, causes the stepping switch to continuously step to its step number 8 at which time further stepping will cease as just described while the closure of contacts 22a energizes the trip coil 11T for immediate opening of the breaker 11.

Subsequent to the stepping of the stepping switch SS to its "lockout" position, the circuit through the winding 18 to the positive potential bus is interrupted by the level 8 of the switch SS whereby the relay 20 becomes deenergized and its contacts 21, 22 and 22a open. Opening of the contacts 21 returns control of the relay to the rectifier SCR8, opening of the contacts 22 returns further control of the energization of the switch level 2 to the rectifier SCR7 and opening of the contacts 22a returns control of the winding 11T to the tripping unit 17. While the connection of the winding 18 to the positive potential bus is illustrated as being through the make before break contacts of switch level 8, such a connection could be to either potential bus and could be through a suitable limit switch which is held in closed condition except when the stepping switch SS reaches or is reaching its lockout position (step 8). Since the Zener diode Z18 is selected to breakover at a voltage between the terminals F and G which occurs as a consequence of a fault current greatly in excess of fault currents which will breakover the diode Z1, the operation of the apparatus for lesser faults is not affected by the presence of the diode Z18 and the associated circuitry.

In order that the controlled rectified SCR8 can be arranged to become conductive at selected magnitudes of the fault current within the indicated range, the resistor R48 can be variable as shown. The variation of the magnitude of the resistance of the resistor R4 will alter the magnitudes of the voltage dropped across the resistors R3 and R48 and thereby the magnitude of the fault current at which sufficient gate current is supplied to render the rectifier SCR8 conducting.

It will be appreciated that whenever the Zener diode Z18 breaks over, the Zener diode Z1 will also breakover to initiate the charging of the capacitor bank CA1. As explained in the copending application of Tenenbaum and Marieni, the rate at which the capacitor bank CA1 is charged to breakover the Zener diode Z11 is an inverse function of the magnitude of the fault current. Therefore at fault currents of sufficient magnitude to cause Zener diode Z18 to breakover, the time required for the breaker 11 to open due to this effect is very short and if desired may be relied upon to actuate the breaker trip coil 11T by eliminating the contacts 22a. Such an operation is accomplished by opening the switch SW1.

Manual closure of the circuit breaker can be accomplished from a remote point by means of a single-pole, single-throw switch CSC (FIG. 1C). When the switch CSC is closed, it connects the resistor R26 across the regulated voltage appearing across the Zener diode Z13 through a capacitor C15 and the resistor R25. The resultant pulse of current through the resistor R26 produces a voltage thereacross sufficient to fire the controlled rectifier SCR5 which now connects the motor close relay MCR across the battery 19 through the auxiliary switch 11S5. The relay closes its contacts MCR1 to establish a closing circuit for the closing motor 11C through the auxiliary switch 11S6. Inasmuch as only one pulse is produced for each closure of the switch CSC, repeated reclosures or pumping of the circuit breaker do not occur if the circuit breaker trips while the switch is held closed. When the switch CSC is opened, the capacitor C15 discharges through the resistors R26 and R27.

When the load supplied through the circuit breaker 11 has been deenergized for a substantial period of time, the closure of the circuit breaker may be accompanied by a substantial flow of current for a short period of time. The current which flows during this brief period may be substantially above the normal range of load current which flows through the circuit breaker after the load has been picked up for a substantial time period. To prevent a tripping operation of the circuit breaker under these conditions, a switch unit CLP (FIG. 1A) is provided. When closed, the switch CLP connects a resistor RCL across the resistors R2 and RH1 to lower the tripping sensitivity of the circuit breaker to line currents. During this period, the sensitivity of the system may still be sufficient to assure a tripping operation in response to an extremely large fault current. After the lapse of a time sufficient to assure proper pickup of the load, the switch CLP may be opened to restore full sensitivity to the system. For similar reasons, a switch CLP1 may be connected across the secondary winding of the transformer CTG.

Preferably the battery 19 is rechargeable and is included as a self-contained part of the control unit. Desirably, a battery charger BC also is included as part of the control unit for the purpose of maintaining the battery in a charged condition in a manner well understood in the art.

The condition of the circuit breaker may be shown in a conventional manner by a red lamp RL and a green lamp GL. The auxiliary switches 11S2A and 11S2B connect the red lamp or the green lamp through a resistor RL1 across the source ACS dependent on whether the circuit breaker is closed or open. Conveniently the switches CST2, CST1, CSC and CLP are ganged for operation by a single three-position handle HTC (FIG. 3). In the "center" position of the handle all of the switches are open. In the "close" position of the handle switches CSC and CLP are closed. In the "trip" position of the handle switches CST2 and CST1 are closed.

From the preceding discussion, it is clear that the system of FIG. 1 provides extremely reliable and flexible operation of a circuit breaker. The overall operation of the system may be summarized as follows.

For a manual closing operation, the switches CLP and CLP1 are closed to desensitize the tripping control of the circuit breaker. In addition the switch CSC is closed for the purpose of energizing the motor close relay MCR which initiates a closing operation of the circuit breaker 11. After expiration of a period of time sufficient to assure subsidence of load currents below cold or pickup values, the switches CLP, CLP1 and CSC are opened. The opening of the switches CLP and CLP1 restores full sensitivity to the system.

If a fault occurs resulting in the flow of line current of moderate fault magnitude, the Zener diode Z1 will breakover and the capacitor unit CA1 is charged to a value sufficient to initiate a tripping operation of the circuit breaker 11. One of many inverse-time-delay-characteristic curves may be selected by operation of the curve-selector 27 and of the adjustable resistor RH3.

In an analogous manner if a fault occurs resulting in the flow of substantial zero-sequence current, the capacitor unit CA2 charges to a value sufficient to trip the circuit breaker 11.

While no circuitry has been illustrated to cause immediate "lockout" of the breaker 11 in response to excessive fault current, it is to be understood that a Zener diode and resistor comparable to the diode Z18 and resistor R48 could be added in shunt with Zener diode Z9 and resistors R11 and R12. The voltage caused when this Zener diode breaks over could be applied to fire the rectifier SCR8 or a second rectifier to cause energization of the relay 20.

If a plug is inserted in a socket in the plate ILO5 which corresponds to the position of the stepping switch, a relatively prompt tripping operation of the circuit breaker is obtained in response to line current. In an analogous manner, a plug inserted in a socket of the plate ILO6 which corresponds to the position of the stepping switch is effective to produce a relatively prompt tripping of the circuit breaker in response to zero-sequence current.

Each tripping operation of the circuit breaker advances the stepping switch.

Following each tripping operation of the circuit breaker 11, provided that no lockout occurs, a time delay in reclosing is measured by the charging of the capacitor unit CA4 which is charged at a rate dependent on the position of the stepping switch and the positions of the plugs PLA, PLB and PLC. Upon the expiration of the time delay determined by the charging of the capacitor unit CA4, the circuit breaker is reclosed. If the fault persists, the circuit breaker again trips and advances the stepping switch. A new reclosing time delay is measured by the charging of the capacitor unit CA4, provided that no lockout occurs, and on the expiration of this time delay the circuit breaker is again reclosed. The tripping and reclosing of the circuit breaker continue until lockout of the breaker occurs, or until the circuit breaker remains closed for a predetermined time.

Upon each reclosure of the circuit breaker 11, a reset time delay is measured by the charging of a capacitor unit CA3 at a manually-selected rate. The reset timer is reset for each operation of the circuit breaker. Consequently, the whole time delay selected for the reset timer is available for each reclosure of the circuit breaker. If the circuit breaker remains reclosed for a time sufficient to permit expiration of the reset time delay, the charge in the capacitor unit CA3 reaches a value sufficient to initiate energization of the integrator coil to reset the stepping switch to its position 10.

If it is desired to limit the operations of the circuit breaker to a predetermined number prior to lockout, the appropriate number of operations may be selected by proper location of the plug PL in one of the sockets in the plate OL. If the circuit breaker fails to remain closed for the time required for operation of the reset timer prior to arrival of the stepping switch at the position selected by the plug PL, the stepping switch steps to its lockout position.

With the control in its lockout position, the light LL is illuminated to indicate that the control is in such lockout position.

If prompt tripping and lockout are desired for the circuit breaker irrespective of the magnitude of the fault current, the switch unit including the switches ILO1, ILO2 and ILO3 is operated to closed condition. If the circuit breaker is closed at the time of such operation, it is conditioned to trip promptly in response to either line or zero-sequence current. In addition, the stepping switch is stepped to its lockout position.

If manual or remote control of the circuit breaker is desired, the switch unit including the switches CST1 and CST2 is closed to initiate a closing operation of the circuit breaker. The switch CST1 is operated to trip condition for the purpose of tripping the circuit breaker while the switch CST2 is operated to cause the stepping switch to step to its lockout position.

Although the application has been described with reference to certain specific embodiments thereof, numerous modifications falling within the spirit and scope of the invention are possible.

What is claimed and is desired to be secured by United States Letters Patent is as follows:

1. In a reclosing switching apparatus, a pair of terminals, means connected to and energizing said terminals with a variable magnitude electrical quantity, switch means having a pair of contacts, contact closing means, contact opening means, an indexing device having an initial position and a lockout position and at least one first position and at least one second position and energizable indexing means stepping said device from one to another of its said positions, each said first position being followed by a said second position, the last said second position being followed by said lockout position, first circuit means connecting said terminals to said contact opening means and to said indexing means, said first circuit means including means sensitive to the magnitude of said quantity at said terminals at said initial and said second positions, said first circuit means being effective at magnitudes of said quantity above a first predetermined value to energize said contact opening means and said indexing means whereby said contacts open and said indexing means steps said indexing device from its said initial position and its said second positions to one of its said first positions, a second circuit means connecting a source of electrical energy to said indexing means and including said first positions of said indexing device, said second circuit means being effective when said indexing device is in a said first position to actuate said indexing means and step said indexing device from its said first position to a said second position, a third circuit means connecting a source of electrical energy to said contact closing means and including said first positions, said third circuit means being effective when said indexing device is in its said first positions to actuate said contact closing means whereby said contacts are closed, a fourth circuit means connecting a source of electrical energy to said indexing means and including said second positions and a timing device, said fourth circuit being effective upon the timing out of said timing device to actuate said indexing means to step said indexing device to its said initial position, a fifth circuit connecting said terminals to said indexing means and including means sensitive to the magnitude of said quantity at said terminals and said initial and said second positions, said fifth circuit means being effective at a magnitude of said quantity above a second predetermined value to energize said indexing means to step said indexing device to its said lockout positions, said second predetermined magnitude being greater than said first predetermined magnitude.

2. In a breaker controlling apparatus, current sensitive means establishing an electrical quantity whose magnitude varies as a function of the magnitude of the current supplied to said current sensitive means, an actuating means, first and second actuating networks, each said network having output connections connected to energize said actuating means and input connections connected to said current sensitive means and responsive to the magnitude of said established electrical quantity, stepping means having an initial position and at least one first position and a lockout position and energizable means for stepping said stepping means from one to another of said positions responsive to an actuating signal from said first network, said first network being effective in response to the existence of a first predetermined magnitude of said quantity to provide said actuating signal to said stepping means and to operate said actuating means from a first to a second condition, a timing device, means connecting said timing device to said actuating means, said timing device being effective at the end of a predetermined time interval to operate said actuating means from its said second condition to its said first condition, said stepping means being effective in said first positions to initiate the timing out of said timing device, said stepping means being ineffective in its said lockout position to initiate said timing out of said timing device, said second network being effective in response to the existence of a second predetermined magnitude of said quantity to operate said actuating means from its said first to its said second condition and to provide said actuating signal to said stepping means for a duration sufficient to step said stepping means to said lockout position.

3. In combination, a stepping switch having an energized device for stepping said switch from an initial position, through a plurality of intermediate positions to a lockout position, an actuator for a control apparatus having first and second operating conditions and first and second sets of contacts, the electrical conducting condition of said sets of contacts being altered as the operating condition of said actuator is changed from said first to said second condition and vice versa, first and second controlling networks having an output circuit, each said network including a sensitive device responsive to the magnitude of a quantity for controlling the energization of its said output circuit, said sensitive device of said first network being responsive to the existence of a first predetermined magnitude of said quantity for altering the energization of said output circuit of said first network, said sensitive device of said second network being responsive to the existence of a second predetermined magnitude of said quantity for altering the energization of said output circuit of said second network, said second predetermined magnitude being greater than said first predetermined magnitude, first and second circuit means individually connecting said output circuits to said control apparatus, each said circuit means including said first set of contacts of said actuator and effective upon energization of one of said output circuits to operate said actuator from its said first to its said second condition, a first switching device of the thyratronic type, said first circuit means being connected to said energized device through said first set of contacts and through said switching device, a timing network actuated to time out each time said stepping switch is stepped to a said first position, a third circuit means connected to said actuator and including said timing network, said third circuit means being effective to operate said actuator from its said second to its said first condition as a consequence of the timing out of said timing network, a second switching device, said second network being connected to said energized device through said second switching device independently of said first set of contacts and of said first switching device, holding means responsive to an initial actuation of said second switching device for maintaining said second switching device actuated whereby said energized device will be maintained effective to step said stepping switch through its said first positions to its said lockout position without further actuation from said second network, and means actuated by said stepping switch when in its said lockout position to render said switch holding means ineffective.

4. A control apparatus for a circuit breaker comprising, a fault responsive means, breaker controlling apparatus including breaker opening means and breaker closing means, means connecting said fault responsive means to said controlling apparatus, said fault responsive means being effective in response to fault magnitudes above a first predetermined value to actuate said controlling apparatus for actuation of said opening means, said controlling apparatus being effective subsequent to each of a predetermined number of said actuations to actuate said closing means, said controlling apparatus being effective subsequent to the next said actuation subsequent to said predetermined number of said actuations to cycle to a lockout position, said controlling apparatus being ineffective to actuate said closing means when in said lockout position, said controlling apparatus being effective as a consequence of a fault magnitude of a second predetermined value to actuate said opening means and to cycle to said lockout position, said controlling apparatus being ineffective to actuate said closing means following its actuation as a consequence of the occurrence of said fault magnitude of said second value, said second value being greater than said first value.

5. A reclosing circuit breaker comprising, contacts, operating means for actuating said contacts including trip means for effecting separation of said contacts and reclosing means for effecting closure of said contacts, fault responsive means for actuating said trip means in response to fault magnitudes above a first predetermined value, stepping means operable to be stepped as a consequence of the occurrence of a fault which produces a said fault magnitude of at least said first predetermined value, said stepping means having at least one circuit reclosing step and a lockout step, said stepping means being effective to actuate said reclosing means for each said reclosing step and ineffective to actuate said reclosing means for said lockout step, said lockout step occurring after the last of said reclosing steps, said stepping means being effective upon the occurrence of a said fault magnitude which is of at least a second predetermined value to step said stepping means to said lockout position in response to an initial occurrence of said fault of said second value, said stepping means being ineffective upon the occurrence of said fault of said second value to actuate said means, said second value being greater than said first value.

6. A circuit interrupting and reclosing apparatus for controlling the connection of a transmission line to a source of electrical energy comprising, fault responsive means adapted to respond to a fault on said line, circuit opening means operatively connected to said fault responsive means and operable thereby in response to the existence of a said fault whereby said line is disconnected from said source, circuit closing means, stepping means connected to said circuit closing means and actuated in response to the occurrence of a said fault to actuate said closing means whereby said line is connected to said source, said stepping means having a lockout position in which it is ineffective to actuate said closing means, and means actuated by said fault responsive means in response to faults in excess of a predetermined magnitude to render said closing means ineffective and to actuate said stepping means to said lockout position.

7. A controller for a reclosing type circuit breaker comprising, fault sensing means having a variable magnitude electrical output quantity, breaker cycling means connected to said sensing means, said cycling means in response to a magnitude of said quantity above a predetermined value being operable into breaker opening condition, said cycling means being operable to cycle itself into breaker closing condition subsequent to a determined time interval subsequent to actuation by said fault sensing means, said cycling means having a lockout position in which it is ineffective to cycle into a said breaker closing condition, said cycling means being operable to cycle into said lockout position subsequent to a predetermined number of said breaker opening cycles, and means actuated by said quantity solely in response to a second magnitude thereof to actuate said cycling means into its said lockout position and to render said cycling means ineffective to cycle into its said breaker closing condition.

References Cited by the Examiner

UNITED STATES PATENTS 3,152,286   10/1964   Field _______________ 317—22

J. D. TRAMMELL, *Assistant Examiner.*

MILTON O. HIRSHFIELD, *Primary Examiner.*